United States Patent [19]

Valin

[11] Patent Number: 4,813,916
[45] Date of Patent: Mar. 21, 1989

[54] SPROCKET HAVING TEETH OF IMPROVED SHAPE AND A CYCLE FREE-WHEEL INCLUDING SAID SPROCKET

[75] Inventor: André L. Valin, Incheville, France
[73] Assignee: Sachs-Huret S.A., Nanterre, France
[21] Appl. No.: 165,523
[22] Filed: Mar. 8, 1988
[51] Int. Cl.[4] ............................................. F16H 55/30
[52] U.S. Cl. .................................. 474/152; 474/158; 74/462
[58] Field of Search ............... 474/152, 158, 162, 164; 74/462

[56] References Cited

U.S. PATENT DOCUMENTS 4,519,791  5/1985  Nagaro ................................ 474/152

Primary Examiner—William P. Neuder
Attorney, Agent, or Firm—Trexler, Bushnell, Giangiorgi & Blackstone, Ltd.

[57] ABSTRACT

Each of the teeth (5) of the sprocket has a Y-shaped top (10) in a view developed along the circumference of the sprocket (5). The principal branch (10a) of the Y extends along the direction (11) of rotation of the sprocket and is located in the central part of the top (10) of the tooth. The two divergent branches (10b, 10c) of the Y are located at the front of the branch (10a) in the direction of rotation of the sprocket. The part of the tooth in the vicinity of the top comprises inclined surfaces which facilitate the reception of a chain on the sprocket. The sprocket is in particular intended for a free-wheel for a cycle providing a plurality of speeds.

8 Claims, 2 Drawing Sheets

SPROCKET HAVING TEETH OF IMPROVED SHAPE AND A CYCLE FREE-WHEEL INCLUDING SAID SPROCKET

The invention relates to a sprocket having teeth of improved shape in particular for a cycle free-wheel having a plurality of speeds.

Cycles and in particular bicycles having a plurality of speeds comprise a free-wheel having an assembly of sprockets whose diameters are different and which are disposed parallel to one another and in succession in the order of size on the body of the free-wheel.

A derailleur permits shifting the chain ensuring the kinematic connection between the chain wheel of the wank gear and the free-wheel, from one sprocket to another either in the rising direction, the chain passing from a sprocket of small diameter to a sprocket of larger diameter, or in the descending direction, in which case the chain passes from a sprocket of large diameter to a sprocket of smaller diameter.

The free-wheel sprockets of the prior art which have teeth in the shape of an involute of a circle do not always permit a reception and an engagement of the chain on the receiving sprocket which is both reliable and rapid. A sliding may occur between the sprocket and the chain which remains perched on the crests of the teeth without being actually engaged.

Consequently, the device for changing the speeds of the cycle operates badly.

Devices are known for controlling the derailleur with an indexing arrangement which are as a rule reliable and rapid in operation in that the chain is correctly engaged on the receiving sprockets. Such improved devices are of interest only in the case where the reception of the chain is ensured in all cases in a satisfactory manner.

An object of the invention is therefore to provide a sprocket having teeth of improved shape in particular for a cycle free-wheel providing a plurality of speeds permitting a reliable and rapid reception of a driving chain on the sprocket.

For this purpose, each of the teeth of the sprocket has a Y-shaped top as viewed developed along the circumference of the sprocket, the principal branch of the Y extending in the direction of rotation and being located in the central part of the top of the tooth and the two divergent branches of the Y being located in front of the principal branch in the direction of rotation of the sprocket, between the principal branch and the lateral flanks of the sprocket and defined adjacent to the interior of the sprocket by surfaces which are inclined toward each other, the lateral flanks of the sprocket constituting in the vicinity of the top of the tooth, in the region of the common branch, surfaces which are outwardly inclined from the crest.

In order to explain the invention, a sprocket for a cycle free-wheel according to the invention will now be described by way of a non-limitative example with reference to the accompanying drawings in which:

FIG. 1 shows a sprocket according to the invention generally designated by the reference character 1.

This sprocket comprises a flange 2 of annular shape whose inner bore 3 enables the sprocket 1 to be assembled with a body of a free-wheel. The outer part of the flange 2 constitutes the teeth 4 of the sprocket.

Figure 1:
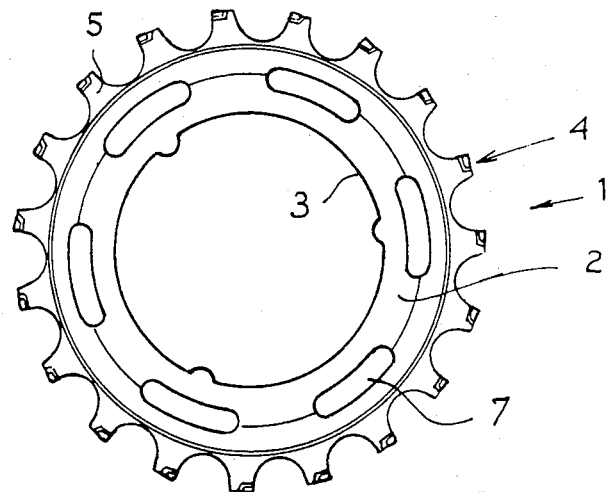
FIG. 1 is a side elevational view of a sprocket according to the invention.
Figure 4:
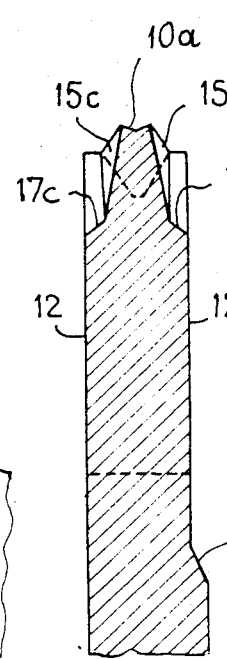
FIG. 4 is a sectional view taken on line 4—4 of FIG. 1 or FIG. 2.
Figure 5:
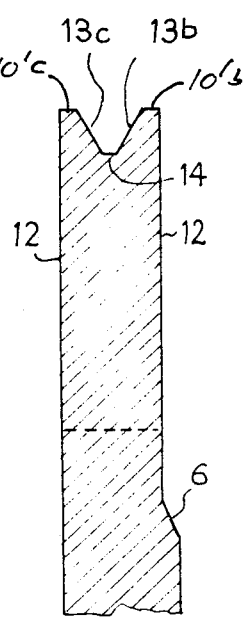
FIG. 5 is a sectional view taken on line 5—5 of FIG. 1 or FIG. 2.

As can be seen in FIGS. 1, 4 and 5, the inner part of the flange 2 has a thickness greater than the tooth 4, the parts of different thicknesses of the sprocket being defined by a frustoconical shape 6.

The sprocket 1 further comprises on the inner part of the flange 2 openings 7.

Figure 2:
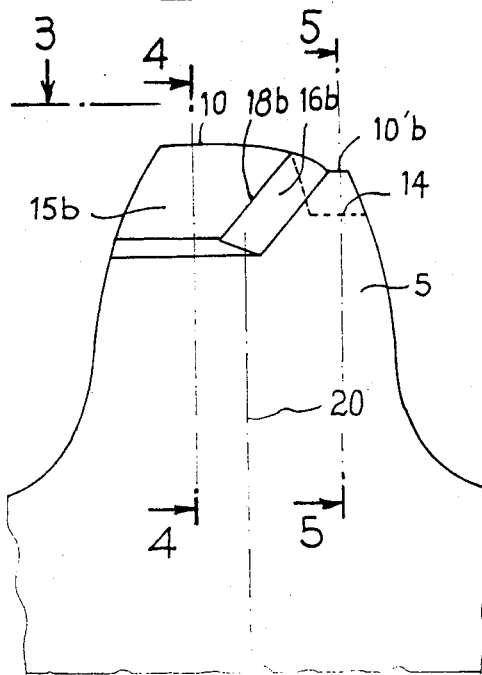
FIG. 2 is a side elevational view to an enlarged scale of a tooth of the sprocket shown in FIG. 1.
Figure 3:
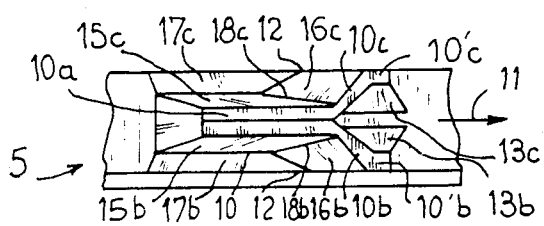
FIG. 3 is a top plan view in the direction of arrow 3 of FIG. 2 showing a developed view of the top of the tooth of FIG. 2.
Figure 6:
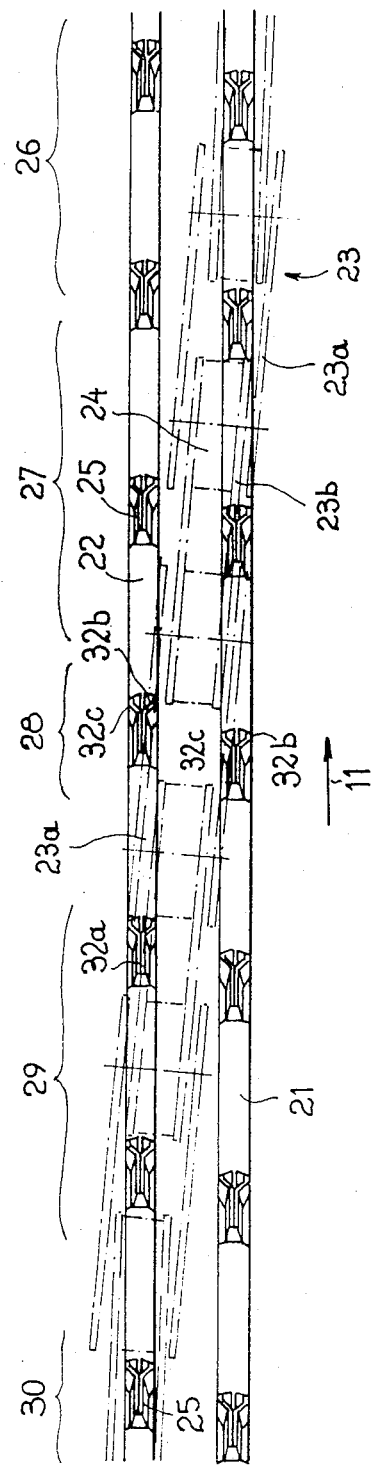
FIG. 6 is a developed view of two neighbouring sprockets of a cycle free-wheel during the passage of the driving chain from one sprocket to another.

According to the invention, each of the teeth 5 of the set of teeth 4 of the sprocket has a top 10 having a Y shape in a view developed along the circumference of the sprocket, as can be seen in FIGS. 2, 3 and 6.

The Y-shaped top is defined by surfaces which are inclined with respect to the lateral flanks 12 of the tooth 5 provided in the lateral flanks of the tooth 5.

Reference will now be made to FIGS. 2, 3, 4 and 5 for describing in detail the shape of a tooth 5 of the sprocket in the vicinity of the top 10 thereof.

The Y-shaped top 10 includes a principal branch 10a extending in the direction 11 of rotation of the sprocket and located in the central part of the top of the tooth, this branch 10a being substantially at equal distances from the lateral flanks 12 of the tooth 5.

The top 10 of the tooth also comprises two divergent branches 10b and 10c each connecting the principal branch 10a of the Y to one of the lateral flanks 12 of the tooth 5. Each of the branches 10b and 10c has an end portion (10′b and 10′c) parallel to the lateral flanks 12 of the tooth. The outer surfaces of the end portions 10′b, 10′c of the branches 10b and 10c are coincident with the corresponding lateral flanks 12 of the tooth 5.

The branches 10b and 10c are defined adjacent to the interior of the sprocket by surfaces 13b and 13c which are inclined toward each other in the direction of the interior of the sprocket. The inclined surfaces 13b and 13c define there between a V-shaped cavity inwardly defined by a flat bottom 14.

The principal branch of the Y, 10a, has a hollow V-shaped radial section as shown in FIG. 4.

This principal branch 10a is defined laterally by surfaces 15b and 15c which are inclined with respect to the lateral flanks 12 of the tooth 5 outwardly from the top 10 of the tooth 5.

The inclined surfaces 15b and 15c intersect in their front part the surfaces 16b and 16c defining the outer part of the divergent branches 10b and 10c of the Y. The surfaces 16b and 16c extend from the branches 10b and 10c toward the base and toward the rear of the tooth 5.

Furthermore, the surfaces 15b and 15c intersect in their part located adjacent to the base of the tooth 5 surfaces 17b and 17c which are inclined with respect to the lateral flanks 12 of the sprocket and join up with these flanks.

The surfaces 15b, 15c, 16b, 17b, 17c are produced from the flanks 12 of the tooth 5. These various surfaces are substantially planar so that their edges of intersection are substantially straight.

The edges 18b and 18c located respectively at the intersection of the surfaces 15b and 16b, 15c and 16c, make, in projection on the lateral flanks 12 of the tooth 5, an angle substantially equal to 40° with the axis 20 of the tooth (FIG. 2).

The rear part of the top 10 of the tooth 5 constituted by the ends 10'b and 10!c of the branches 10b and 10c is located, in the radial direction of the axis 20 of the tooth 5, closer to the base of the tooth 5, i.e. lower than the front part of the top 10 constituted by the principal branch 10a of the Y.

The principal branch 10a of the Y is slightly inclined towards the parts 10'b and 10'c and the divergent parts of the branches 10b and 10c are inclined toward their ends 10'b and 10'c in the radial direction and toward the front of the tooth 5.

In the direction 11 of rotation of the sprocket, the extent of the branch 10a represents approximately two thirds of the length of the top of the tooth, the divergent branches 10b and 10c representing one third of this length.

FIG. 6 is a view developed along their circumference, i.e. in their direction of rotation 11, of two neighbouring sprockets 21, 22 of a cycle free-wheel.

The sprocket 21 has a diameter less than the diameter of the sprocket 22.

The successive teeth 25 of the sprockets 21 and 22 have a Y-shaped top and a shape in the vicinity of their top as shown in a developed view in FIG. 3.

Also shown in dot-dash lines in FIG. 6 is the chain 23 of the cycle during its passage from the sprocket 21 of small diameter to the sprocket 22 of larger diameter, achieved by using the derailleur of the cycle.

The various stages of the hooking and engagement of the chain are seen along the length of this chain 23 in the direction from the right to the left.

The chain 23 comprises in the conventional manner outer links 23a and inner links 23b which are articulated together by pins 24.

The teeth 25 of the sprockets are engaged in the chain between the articulation devices of the links.

In the right part of FIG. 6 (region 26), the chain 23 is engaged on the small sprocket 21. In the following region 27, the chain is in process of passing, under the effect of the derailleur, from the sprocket 21 to the larger sprocket 22.

In the region 28, the chain 23 comes to engage by the lateral part of its outer link 23a adjacent to the sprocket 22 with the divergent branch 32b of the top of a tooth 25 adjacent to the sprocket 21. There is thus achieved the gripping of the chain 23, the region 28 in FIG. 6 corresponding to the stage of the hooking of the chain 23 onto the larger sprocket 22. As the sprockets of the free-wheel rotate in the direction of arrow 11, the chain 23 retained by the branch 32b which corresponds to the branch 10b of the tooth shown in FIG. 3, is driven by means of the inclined surface corresponding to the surface 13b of FIG. 3 in a direction which moves it away from the sprocket 21, i.e., facilitates the engagement on the sprocket 22.

The chain 23 reaches, subsequent to its hooking, a region of the top of a tooth 25 corresponding to the principal branch 32a. The top of the tooth in the region of the principal branch 32a has a reduced thickness in the transverse direction. Moreover, this part of the top of the tooth is defined by inclined surfaces extending toward the exterior and similar to the surfaces 15b and 15c of the tooth shown in FIGS. 2 to 5.

Consequently, the corresponding link of the chain 23 cannot remain in equilibrium on the top of the tooth and is very rapidly engaged on this tooth 25 in the course of an intermediate stage of the reception of the chain on the sprocket 22 shown in the region 29.

In the zone 30, there is shown the final stage in which the link of the chain is completely engaged on a tooth 25 of the sprocket 22.

It is therefore quite clear that the engagement of the chain on the receiving sprocket is much more rapid and much more reliable.

In the case of the passage of the chain in the other direction from the large sprocket 22 to the smaller sprocket 21, the hooking of the chain is ensured by the branch 32c of a tooth 25 of the sprocket 21 extending toward the sprocket 22. The engagement of the link on the tooth is ensured in the same way as before.

In all cases, the reception of the chain and the changing of the speed are facilitated in that the teeth of the sprocket are more aggressive with respect to the chain owing to the presence of the branches of the narrow Y.

The scope of the invention is not intended to be limited to the embodiment just described.

A different arrangement may be imagined, while retaining the Y shape of the top of the tooth, of the inclined surfaces defining this Y shape. The disposition and the inclination of these surfaces may be different. However, the divergent branches located in the front part of the tooth must be defined adjacent to the interior of the sprocket by convergent inwardly extending surfaces: the rear part of the top of the tooth constituted by the principal branch must be defined by surfaces which are outwardly inclined from the top.

The scope of the invention is not intended to be limited to the case of sprockets for a cycle free-wheel having a plurality of speeds but is applicable whenever a transmission chain is made to pass under the effect of a control mechanism from one sprocket to another, these sprockets being disposed coaxially and parallel to each other.

I claim:

1. A sprocket having lateral flanks and teeth of improved shape, in particular for a cycle free-wheel providing a plurality of speeds, wherein each of the teeth of the sprocket has a Y-shaped top in a view developed along the circumference of the sprocket, comprising a principal branch and two divergent branches, the principal branch of the Y extending in the direction of rotation of the sprocket and being located in a central part of the top of the tooth and the two divergent branches of the Y being located in front of the principal branch in the direction of rotation of the sprocket, between the principal branch and said lateral flanks of the sprocket and defined adjacent to the interior of the sprocket by surfaces which are inclined toward each other, each tooth of the sprocket constituting in the vicinity of the top of the tooth in the region of the principal branch, surfaces which are outwardly inclined from said top.

2. A sprocket according to claim 1, wherein the principal branch of the tooth occupies, along the length of said top of the tooth in the direction of rotation of the sprocket, a length which is substantially equal to two thirds of the length of said top of the tooth, the divergent branches occupying the remaining third of said length.

3. A sprocket according to claim 1, wherein the divergent branches of the top of the tooth include front end parts located, relative to a radially extending axis of the tooth, closer to a base of the tooth than a rear part of said top of the tooth constituted by the principal branch.

4. A sprocket according to claim 3, wherein said front end parts of the branches are parallel to the lateral flanks of the sprocket.

5. A sprocket according to claim 1, wherein the divergent branches are defined adjacent to the exterior of the sprocket in the direction of the lateral flanks by surfaces which are inclined toward the base of the tooth and toward the rear of the tooth.

6. A sprocket according to claim 5, wherein the inclined surfaces defining the principal branch of said top of the tooth and the surfaces defining the branches adjacent to the exterior are substantially planar and intersect along straight edges which are inclined with respect to a radially extending axis of the tooth.

7. A sprocket according to claim 1, wherein surfaces inclined toward the base of the tooth and toward the lateral flanks connect the inclined surfaces defining the principal branch of said top of the tooth to the lateral flanks of the tooth.

8. A free wheel for a cycle comprising a body and at least two sprockets disposed coaxially and in parallel relation to each other on said body, each sprocket having lateral flanks and teeth of improved shape, wherein each of the teeth of the sprocket has a Y-shaped top in a view developed along the circumference of the sprocket, comprising a principal branch and two divergent branches, the principal branch of the Y extending in the direction of rotation of the sprocket and being located in a central part of the top of the tooth and the two divergent branches of the Y being located in front of the principal branch in the direction of rotation of the sprocket, between the principal branch and said lateral flanks of the sprocket and defined adjacent to the interior of the sprocket by surfaces which are inclined toward each other, each tooth of the sprocket constituting in the vicinity of the top of the tooth in the region of the principal branch, surfaces which are outwardly inclined from said top.

* * * * *